United States Patent
Suenaga et al.

(10) Patent No.: US 12,264,081 B2
(45) Date of Patent: Apr. 1, 2025

(54) TUNGSTEN HEXAFLUORIDE MANUFACTURING METHOD, TUNGSTEN HEXAFLUORIDE PURIFICATION METHOD, AND TUNGSTEN HEXAFLUORIDE

(71) Applicant: CENTRAL GLASS COMPANY, LIMITED, Yamaguchi (JP)

(72) Inventors: Takashi Suenaga, Ube (JP); Takuya Kita, Ube (JP); Ryuichi Nakamura, Ube (JP)

(73) Assignee: CENTRAL GLASS COMPANY, LIMITED, Yamaguchi (JP)

( * ) Notice: Subject to any disclaimer, the term of this patent is extended or adjusted under 35 U.S.C. 154(b) by 849 days.

(21) Appl. No.: 17/442,445

(22) PCT Filed: Mar. 19, 2020

(86) PCT No.: PCT/JP2020/012268
§ 371 (c)(1),
(2) Date: Sep. 23, 2021

(87) PCT Pub. No.: WO2020/196248
PCT Pub. Date: Oct. 1, 2020

(65) Prior Publication Data
US 2022/0348477 A1 Nov. 3, 2022

(30) Foreign Application Priority Data
Mar. 25, 2019 (JP) .................................. 2019-056045

(51) Int. Cl.
*C01G 41/04* (2006.01)
(52) U.S. Cl.
CPC .................... *C01G 41/04* (2013.01)

(58) Field of Classification Search
CPC .............................. C01G 41/04; C01G 41/00
See application file for complete search history.

(56) References Cited

U.S. PATENT DOCUMENTS 5,324,498 A * 6/1994 Streusand .............. C01G 41/04
423/489

FOREIGN PATENT DOCUMENTS

| CN | 101070190 | 11/2007 |
| CN | 105417583 | 8/2017 |
| CN | 107459062 | 12/2017 |
| CN | 108658129 | 10/2018 |

(Continued)

OTHER PUBLICATIONS

International Search Report issued May 26, 2020 in International (PCT) Application No. PCT/JP2020/012268.

*Primary Examiner* — Anthony J Zimmer
*Assistant Examiner* — Eric Scott Sherman
(74) *Attorney, Agent, or Firm* — Wenderoth, Lind & Ponack, L.L.P.

(57) ABSTRACT

A tungsten hexafluoride manufacturing method of the present invention includes a reaction step of reacting tungsten with a gas of a fluorine element-containing compound so as to obtain a mixture that contains tungsten hexafluoride and hydrogen fluoride-containing impurities, and a discharge step of performing distillation of the mixture while performing a discharge operation at least two or more times during the distillation so as to obtain tungsten hexafluoride, the discharge operation being an operation in which a storage operation and a purge operation are alternately performed.

12 Claims, 2 Drawing Sheets

(56) References Cited

FOREIGN PATENT DOCUMENTS

JP  2000-72442  3/2000
JP  2003-238161  8/2003

* cited by examiner

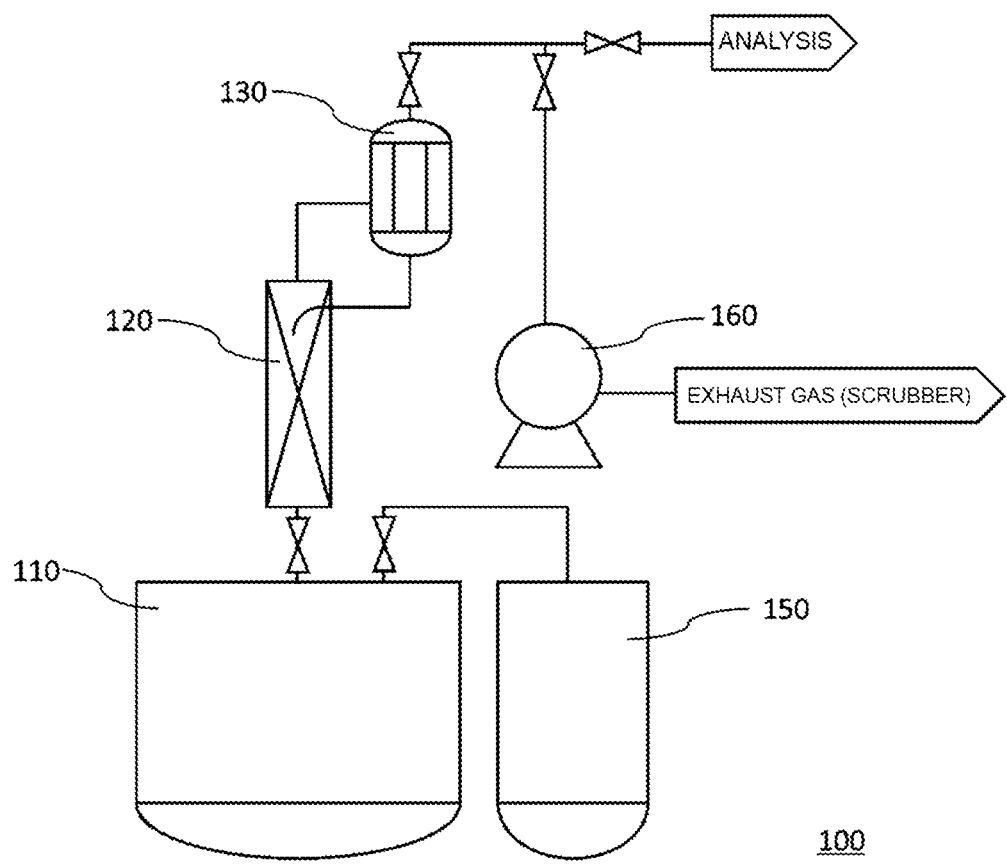

TUNGSTEN HEXAFLUORIDE MANUFACTURING METHOD, TUNGSTEN HEXAFLUORIDE PURIFICATION METHOD, AND TUNGSTEN HEXAFLUORIDE

TECHNICAL FIELD

The present invention relates to tungsten hexafluoride manufacturing method, a tungsten hexafluoride purification method, and tungsten hexafluoride.

BACKGROUND ART

Being a metal having a high melting point and low electric resistance, tungsten is widely used in the form of simple metal or tungsten silicide as a material for various electronic materials. Tungsten used in the field of electronic materials, especially in the field of semiconductors, needs to have high purity. As a method for obtaining high-purity tungsten, a CUD method using tungsten hexafluoride ($WF_6$) as a raw material gas is used.

Tungsten hexafluoride is usually manufactured by the reaction between metallic tungsten (W) and a fluorine gas ($F_2$). The manufactured tungsten hexafluoride contains hydrogen fluoride (HF) derived from by-products generated by hydrolysis or raw materials.

As a technique for removing hydrogen fluoride from tungsten hexafluoride, for example, the technique described in Patent Document 1 is known. Patent Document 1 describes a method of continuously discharging impurity gas components from a condenser in a state where tungsten hexafluoride is refluxed (Example of Patent Document 1).

RELATED DOCUMENT

Patent Document

[Patent Document 1] Chinese Patent No. CN105417583B

SUMMARY OF THE INVENTION

As a result of studies, the inventors of the present invention have revealed that the tungsten hexafluoride purification method described in Patent Document 1 can be further improved to achieve both the high yield of tungsten hexafluoride and the reduction of hydrogen fluoride concentration.

As a method for manufacturing tungsten hexafluoride by reacting tungsten with a gas of a fluorine element-containing compound, such as a fluorine gas or a nitrogen trifluoride gas, generally, the following step (1) or (2) is used.

$$W + 3F_2 \rightarrow WF_6 \quad (1)$$

$$W + 2NF_3 \rightarrow WF_6 + N_2 \quad (2)$$

Usually, a mixture containing tungsten hexafluoride manufactured by (1) or (2) contains impurities, such as hydrogen fluoride derived from by-products generated by hydrolysis or raw materials.

The boiling point of tungsten hexafluoride is 17.1° C., and the boiling point of hydrogen fluoride is 19.5° C. Therefore, low-boiling-point impurities, such as hydrogen fluoride, having a boiling point close to that of tungsten hexafluoride are known to difficult to selectively remove.

By refluxing tungsten hexafluoride from the lower portion of a condenser, it is possible to obtain tungsten hexafluoride containing concentrated hydrogen fluoride in a gas phase. By purging the tungsten hexafluoride containing concentration hydrogen fluoride from the upper portion of the condenser, it is possible to reduce the hydrogen fluoride concentration in the tungsten hexafluoride.

However, it has been revealed that in a case where continuous discharge is performed using a distillation apparatus as described in Patent Document 1 so that the hydrogen fluoride concentration is reduced until tungsten hexafluoride having the desired high purity is obtained, the amount of tungsten hexafluoride distilled off is increased, and yield of tungsten hexafluoride is significantly reduced. For example, according to Example 1 of Patent Document 1, in a case where tungsten hexafluoride having a hydrogen fluoride concentration of 0.12 ppm is obtained, the yield of tungsten hexafluoride is 85.7%. That is, it has been found that there is a trade-off relationship between reducing hydrogen fluoride concentration and increasing tungsten hexafluoride yield.

An object of the present invention is to provide a tungsten hexafluoride manufacturing method and a tungsten hexafluoride purification method for obtaining high-purity tungsten hexafluoride with high yield while reducing the concentration of hydrogen fluoride.

The inventors of the present invention further conducted intensive studies based on the above knowledge. As a result, the inventors have found that in a case where a discharge operation is performed at least two or more times, the discharge operation consisting of an operation of creating a total reflux state of tungsten hexafluoride in a distillation column and obtaining tungsten hexafluoride having a concentrated hydrogen fluoride-containing impurity gas in a gas phase portion in the distillation column and an operation of purging the tungsten hexafluoride having concentrated hydrogen fluoride-containing impurities from the upper portion of a condenser, the total purge amount can be reduced, which makes it possible to increase yield of tungsten hexafluoride while reducing the hydrogen fluoride concentration in the tungsten hexafluoride. Based on this finding, the inventors have accomplished the present invention.

According to the present invention, there is provided a tungsten hexafluoride manufacturing method, including a reaction step of reacting tungsten with a gas of a fluorine element-containing compound so as to obtain a mixture that contains tungsten hexafluoride and hydrogen fluoride-containing impurities, and "discharge step" of performing distillation of the mixture while repeating "discharge operation" during the distillation so as to obtain tungsten hexafluoride, in which "discharge operation" is defined as a series of operations consisting of the following "storage operation" and the subsequent "purge operation".

(Operation)

Storage operation: an operation of creating a total reflux state in a distillation column and then obtaining a mixture gas containing the concentrated hydrogen fluoride in a gas phase portion in the distillation column.

Purge operation: an operation of purging the mixture gas from an upper portion of a condenser provided in the gas phase portion and then stopping the purging.

Furthermore, according to the present invention, there is provided a tungsten hexafluoride purification method including a discharge step of performing distillation of a mixture that contains hydrogen fluoride-containing impurities and tungsten hexafluoride while performing a discharge operation at least two or more times during the distillation so as to obtain tungsten hexafluoride, the discharge operation being an operation in which the storage operation and the purge operation are alternately performed.

Furthermore, according to the present invention, there is provided tungsten hexafluoride containing hydrogen fluoride, in which a content of the hydrogen fluoride is equal to or less than 100 ppm by mass with respect to a total mass of the tungsten hexafluoride.

According to the present invention, there are provided a tungsten hexafluoride manufacturing method and a tungsten hexafluoride purification method for obtaining tungsten hexafluoride with a high yield while reducing the concentration of hydrogen fluoride, and tungsten hexafluoride obtained using these methods.

BRIEF DESCRIPTION OF THE DRAWINGS

FIG. 2 is a view schematically showing the configuration of a distillation apparatus.

DESCRIPTION OF EMBODIMENTS

Figure 1:
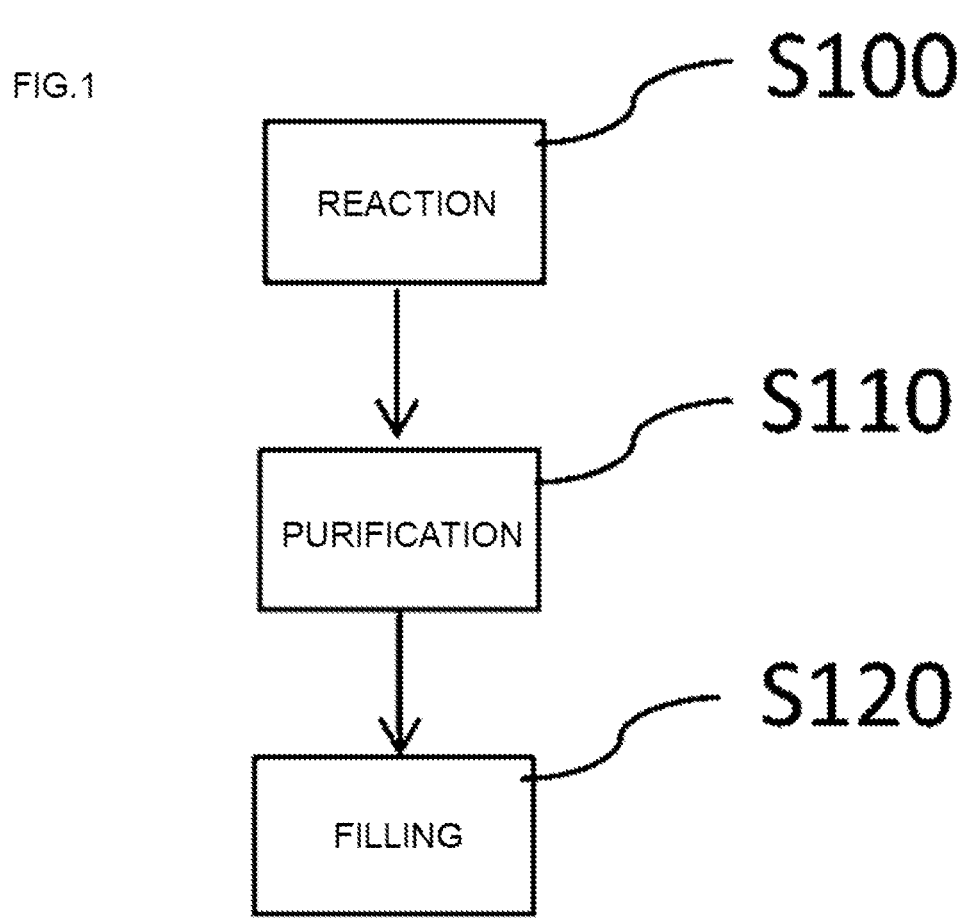
FIG. 1 is a view showing an example of a flow of a tungsten hexafluoride manufacturing process according to the present embodiment.

Hereinafter, embodiments of the present invention will be described using drawings. In all drawings, the same constituents are marked with the same reference signs and may not be repeatedly described as appropriate. The drawings are schematic views and do not agree with the actual dimensional ratio.

The tungsten hexafluoride manufacturing method of the present embodiment will be schematically described.

The tungsten hexafluoride manufacturing method of the present embodiment includes a reaction step of reacting tungsten with a gas of a fluorine element-containing compound so as to obtain a mixture that contains tungsten hexafluoride and hydrogen fluoride-containing impurities, and a discharge step of performing distillation of the mixture while performing a discharge operation at least two or more times during the distillation so as to obtain tungsten hexafluoride, the discharge operation being an operation in which the following storage operation and purge operation are alternately performed.

(Operation)

Storage operation: an operation of creating a total reflux state in a distillation column and then obtaining a mixture gas containing concentrated hydrogen fluoride in a gas phase portion in the distillation column.

Purge operation: an operation of purging the mixture gas from an upper portion of a condenser and then stopping the purging.

As described above, usually, the tungsten hexafluoride-containing mixture manufactured by the chemical reaction described in Formula (1) or (2) contains residual hydrogen fluoride derived from the raw material (gas of a fluorine element-containing compound, such as $F_2$) of the reaction. In addition, in a case where the gas of a fluorine element-containing compound is hydrolyzed by water, a small amount of hydrogen fluoride is generated.

In the present invention, the aforementioned source of hydrogen fluoride contained in crude tungsten hexafluoride as a raw material of distillation is merely an example, and is not particularly limited. The hydrogen fluoride concentration in the crude tungsten hexafluoride as a raw material of distillation is not particularly limited. The hydrogen fluoride concentration with respect to the total mass of the crude tungsten hexafluoride as a raw material of distillation including impurities is preferably equal to or less than 6% by mass in general, and more preferably equal to or less than 1% by mass. It is preferable to use such a raw material of distillation having a hydrogen fluoride content equal to or less than a predetermined amount, because then the purge amount in the distillation step is relatively small, and the load of the distillation operation can be further reduced.

In the present specification, "purge amount" refers to the total amount of gas, such as tungsten hexafluoride or hydrogen fluoride, purged to the outside of the system in "discharge step" during the distillation step.

According to the knowledge of the inventors of the present invention, in a case where a discharge operation is performed two or more times, the discharge operation consisting of an operation of totally refluxing a tungsten hexafluoride mixture in a distillation column so as to obtain a mixture that contains tungsten hexafluoride having concentrated hydrogen fluoride-containing impurities in a gas phase portion in the distillation column and an operation of storing the mixture in an upper portion of a condenser and then purging the mixture, the total purge amount can be equal to or less than 5% by mass with respect to the amount of tungsten hexafluoride not yet being subjected to distillation (also called crude tungsten hexafluoride) provided that the amount of hydrogen fluoride contained in the crude tungsten hexafluoride is equal to or less than 2.5% by mass with respect to the feed amount of the crude tungsten hexafluoride, and the purge amount can be equal to or less than 1% by mass with respect to the feed amount of the crude tungsten hexafluoride provided that the amount of hydrogen fluoride contained the crude tungsten hexafluoride is equal to or less than 0.5% by mass.

Therefore, it is possible to increase yield of tungsten hexafluoride while reducing the hydrogen fluoride concentration in the tungsten hexafluoride. As a result, it is possible to purify and manufacture high-purity tungsten hexafluoride with excellent yield.

In addition, according to the knowledge of the inventors of the present invention, in a case where tungsten hexafluoride in a distillation still is vaporized and then collected in a liquid state into a receiver, it is possible to leave high-boiling-point impurities (reaction products of fluorine element-containing compounds and impurities being likely to be mixed into the raw material tungsten, which are compounds having a boiling point being equal to or lower than 200° C. and relatively higher than the boiling point of hydrogen fluoride), such as $CrF_5$, $SbF_5$, $NbF_5$, and $TaF_5$, in the distillation still. The tungsten hexafluoride in the receiver in a liquid state may be directly transferred to a storage container so that the container is filled. The tungsten hexafluoride in the receiver may be vaporized and collected in a liquid state into a storage container. Alternatively, the tungsten hexafluoride in the distillation still may be vaporized and then directly collected in a liquid state into a storage container. In this way, tungsten hexafluoride having higher purity can be realized.

The tungsten hexafluoride purification method of the present embodiment includes a discharge step of performing distillation of a mixture that contains hydrogen fluoride-containing impurities and tungsten hexafluoride while performing a discharge operation at least two or more times during the distillation so as to obtain tungsten hexafluoride, the discharge operation being an operation in which the storage operation and the purge operation are alternately performed. This purification method makes it possible to reduce the content of low-boiling-point impurities, such as hydrogen fluoride, in tungsten hexafluoride.

The tungsten hexafluoride purification method of the present embodiment can provide tungsten hexafluoride to be used as a raw material gas for CVD for manufacturing high-purity tungsten powder useful as a sputtering target, a conductive paste material, and the like, or as a raw material gas for CVD for semiconductor manufacturing.

In a case where high-purity tungsten hexafluoride is used as a raw material gas for CVD for semiconductor manufacturing, it is possible to inhibit impurities from being incorporated into a film formed by CVD. Furthermore, it is possible to inhibit devices from being negatively affected by the diffusion of impurities and the like.

Therefore, using the tungsten hexafluoride obtained by the manufacturing method of the present embodiment makes it possible to realize excellently reliable devices.

Hereinafter, each step of the tungsten hexafluoride manufacturing method of the present embodiment will be specifically described.

The tungsten hexafluoride manufacturing method of the present embodiment can include a reaction step (S100), a purification step (S110), and a filling step (S120) which is an optional step. FIG. 1 shows an example of the flow of the steps (S100 to S120).

The tungsten hexafluoride manufacturing method of the present embodiment is not limited to the above steps. If necessary, one or two or more known operations, such as purification, collection, degassing, and liquid transfer, may be combined with the manufacturing method. One or more operations among the above may be performed multiple times. The order of performing the operations can be appropriately selected.

In the reaction step (S100), tungsten is reacted with a gas of a fluorine element-containing compound, which makes it possible to obtain a mixture that contains hydrogen fluoride-containing impurities and tungsten hexafluoride. The impurities are composed of components other than tungsten hexafluoride. In the reaction step, the reaction formula (1) or (2) described above can be adopted. Particularly, from the viewpoint of manufacturing stability, it is possible to use the reaction formula (1) in which metallic tungsten is reacted with a fluorine gas.

The mixture obtained by the reaction step (tungsten hexafluoride mixture) contains a tungsten hexafluoride compound and an impurity derived from the raw material metallic tungsten, an impurity derived from the fluorine gas, or an impurity intermixed in the manufacturing process. In some cases, the mixture contains, as these impurities, high-boiling-point impurities, such as $CrF_5$, $SbF_5$, $NbF_5$, and $TaF_5$, in addition to the low-boiling-point impurities such as hydrogen fluoride.

Subsequently, the tungsten hexafluoride mixture (gas) may be collected into a collection container, and the collection container may be degassed. In this collection step, it is also possible to collect the gaseous tungsten hexafluoride into a collection container cooled to about −50° C. and to solidify the gas. Then, the gas layer in the upper portion of the collection container is removed by a vacuum pump. At this time, the inside of the collection container may be purged with an inert gas, such as helium, and degassed.

The tungsten hexafluoride mixture may be heated, for example, to a temperature of about 10° C. so that the mixture having turned into a liquid is collected.

In the subsequent purification step (S110), a distillation step of distilling and purifying the tungsten hexafluoride mixture is performed. In the purification step, the tungsten hexafluoride mixture obtained through the collection step described above may be distilled and purified.

As the distillation method, known distillation methods can be used. For example, any of a batch distillation method and a continuous distillation method is used. The distillation method can be used in combination with any of atmospheric distillation, distillation under reduced pressure (vacuum distillation), and pressure distillation.

An example of the distillation step according to the present embodiment will be described in which a distillation apparatus 100 shown in FIG. 2 is used.

The distillation apparatus 100 shown in FIG. 2 includes a distillation still 110, a distillation column 120, a condenser 130, and a receiver 150. The distillation still 110, the distillation column 120, and the condenser 130 are connected to each other. Furthermore, the distillation still 110 and the receiver 150 (receiving tank) are connected to each other.

The tungsten hexafluoride mixture (liquid) is transferred from the collection container to the distillation still 110. The liquid may be transferred to the distillation still 110 from a product tank different from the collection container.

The distillation still 110 heats the introduced tungsten hexafluoride mixture (liquid). The heating temperature of the distillation still 110 can be adjusted, for example, to about 20° C. to 50° C. The heated tungsten hexafluoride (gas) moves to the distillation column 120.

The distillation column 120 may be in the form of a packed column filled with a packing material, or in the form of a tray column provided with multiple trays.

The packing material contained in the distillation column 120 is not particularly limited as long as it is a known regular or irregular packing material. The packing material may be made of a metal, ceramic, or plastic, and is preferably made of an anticorrosive metal. From the viewpoint of low cost and ease of handling, a packing material made of nickel or SUS is more preferable. In a case where such a packing material is used, it is possible to inhibit intermixing of metal impurities in the process of distillation. For example, irregular packing materials in the form of a packing, a ring, a ball, and the like may be used.

The distillation column 120 containing the packing material moves the tungsten hexafluoride (gas), which has moved in from the distillation still 110, to the condenser 130, and brings the tungsten hexafluoride (liquid) refluxed from the condenser 130 into contact with the gas on the surface of the packing material.

The condenser 130 is connected to the top of the distillation column 120. The condenser 130 cools the tungsten hexafluoride (gas) that has passed through the distillation column 120, and returns (refluxes) the cooled tungsten hexafluoride (liquid) from the lower portion of the condenser 130 into the distillation column 120 via a reflux line.

The conditions of reflux described above can be appropriately controlled, for example, by adjusting the flow rate of a refrigerant in the condenser 130, the refrigerant temperature at the inlet and outlet, the internal temperature of the column top, the flow rate of a heat medium in the distillation still, and the like.

The internal temperature of the condenser 130 may be set to an appropriate temperature depending on the internal pressure of the condenser 130. For example, the internal temperature of the condenser 130 is 5° C. to 100° C., preferably 8° C. to 70° C., and more preferably 10° C. to 50° C. In a case where the internal pressure is high, the internal temperature may be set high. In a case where the internal temperature is set as described above, it is possible to selectively store the hydrogen fluoride gas in the upper portion of the condenser 130.

From the top portion of the condenser 130, low-boiling-point impurities in a gas phase are removed via a gas purge line. It is possible to control the purge amount or to start or finish purge by opening and closing a valve in the gas purge line.

In the present embodiment, during the distillation of tungsten hexafluoride, in which the vaporized tungsten hexafluoride mixture is introduced into the condenser 130 and refluxed in the distillation column 120 from the lower portion of the condenser 130, a discharge step is performed in which a discharge operation of alternately conducting the following storage operation and purge operation is carried out at least two or more times.

(Operation)

Storage operation: an operation of creating a total reflux state in the distillation column 120 and then obtaining a mixture gas containing concentrated hydrogen fluoride in a gas phase portion in the distillation column 120.

Purge operation: an operation of purging a mixture gas that contains concentrated hydrogen fluoride-containing impurities from the upper portion of the condenser 130 and then stopping the purging.

As described above, the manufacturing method of the present embodiment includes the operations, total reflux (storage operation), purge, and purge stop (purge operation). Therefore, with the manufacturing method, it is possible to efficiently remove hydrogen fluoride and to reduce the loss rate of tungsten hexafluoride.

In a case where the gas phase portion is continuously purged, the hydrogen fluoride concentration in the tungsten hexafluoride in the distillation still is reduced due to the purge. Therefore, the gas phase portion in which hydrogen fluoride is not yet sufficiently concentrated is continuously purged, and the loss rate of tungsten hexafluoride increases. In a case where the purge is stopped, and the total reflux state is kept in the gas phase until hydrogen fluoride is concentrated, it is possible to purge tungsten hexafluoride containing concentrated hydrogen fluoride. Hydrogen fluoride can be more efficiently removed in a case where the storage operation and the purge operation are repeated, than in a case where continuous discharge is carried out. Therefore, the total purge amount can be reduced, and the loss rate of tungsten hexafluoride can be reduced.

As long as the effects of the present invention are not impaired, the discharge operation described above may or may not include an additional operation other than the storage operation and the purge operation.

In addition, as long as the effects of the present invention are not impaired, the discharge step described above may or may not include another operation between the first and second discharge operations repeated.

In the present embodiment, it is possible to repeat the discharge operation to obtain tungsten hexafluoride satisfying the following condition.

(Condition)

Condition: The upper limit of the content of hydrogen fluoride in tungsten hexafluoride obtained after the discharge step is not particularly limited; however, the upper limit of the content of hydrogen fluoride with respect to the total mass of tungsten hexafluoride is generally equal to or less than 100 ppm by mass, preferably equal to or less than 10 ppm by mass, more preferably equal to or less than 1 ppm by mass, and even more preferably equal to or less than 0.1 ppm by mass. The lower limit of the content of hydrogen fluoride is not particularly limited, but may be, for example, equal to or more than 0.1 ppb by mass with respect to the mass of the tungsten hexafluoride. The content of hydrogen fluoride is reduced as described above, which makes it possible to realize high-purity tungsten hexafluoride excellent in manufacturing stability of products. By repeating the above discharge operation, it is possible to obtain tungsten hexafluoride satisfying the above condition.

In a case where n in "nth discharge operation", such as the 1st discharge operation and the 2nd discharge operation, represents a number equal to or greater than 2, V1 represents a purge amount in the 1st purge operation, V2 represents a purge amount in the 2nd purge operation, Vn represents a purge amount in nth purge operation, and the discharge operation is repeated n times, the total purge amount in the purge operation is represented by $\Delta V = V1 + V2 + \ldots + Vn$.

In a case where a represent "content of hydrogen fluoride in crude tungsten hexafluoride introduced into a distillation still", b represents "content of hydrogen fluoride remaining in tungsten hexafluoride after a discharge step", and c represents "loss (which will be described later) of tungsten hexafluoride having undergone a distillation step", the total purge amount ($\Delta V$) equals "a−b+c".

For example, in a preferred embodiment, in a case where the content of hydrogen fluoride in the crude tungsten hexafluoride introduced into the distillation still is 0.1% to 5% by mass with respect to the total mass of the crude tungsten hexafluoride, and the content of hydrogen fluoride in tungsten hexafluoride obtained after the discharge step is equal to or less than 100 ppm by mass with respect to the total mass of the tungsten hexafluoride, $\Delta V$ with respect to the amount of 100% by mass of the crude tungsten hexafluoride can be, for example, equal to or more than 0.1% by mass and equal to or less than 5% by mass, preferably equal to or more than 0.3% by mass and equal to or less than 3% by mass, and more preferably equal to or more than 0.5% by mass and equal to or less than 1.0% by mass.

From the viewpoint of reducing the hydrogen fluoride concentration, the lower limit of n may be an integer equal to or greater than 2 or may be equal to or greater than 3, 5, or 10. From the viewpoint of productivity in the manufacturing process, the lower limit of n may be, for example, equal to or less than 50 or may be equal to or less than 30 or 20.

In a distillation apparatus having a storage tank at the bottom portion of a distillation column, a condenser at the top portion of the distillation column, and a reflux line installed to start from the bottom portion of the condenser, the storage tank is heated to a temperature equal to or higher than the boiling point of tungsten hexafluoride, and the condenser is cooled to a temperature equal to or lower than the boiling point of tungsten hexafluoride, so that the distillation operation starts. The total reflux state means a state where the gas returns from the reflux line at a constant flow rate while no gas is purged to the outside of the system. In a case where the hydrogen fluoride concentration in the gas phase component at the outlet of the condenser does not change for 1 hour or more, this is preferably adopted as a time period in which the purge operation can be started. Regarding the purge amount per operation, a purge amount which is at least 3 times the empty bed volume of the condenser is preferably adopted as the minimum purge amount.

In the discharge step, the time of the storage operation preceding the purge operation can be set depending on the content of hydrogen fluoride in tungsten hexafluoride. In a case where the time of the storage operation is set as above, even though the proportion of hydrogen fluoride contained in a liquid phase is low, the proportion of hydrogen fluoride contained in a gas phase can be increased, which makes it possible to remove a sufficient amount of hydrogen fluoride by the purge operation.

As a result, the purge amount can be appropriately controlled depending on the proportion of hydrogen fluoride contained, the loss rate can be further reduced accordingly.

The purged gas is removed from the distillation apparatus 100 via an exhaust gas pump 160.

By performing the discharge step as described above, it is possible to reduce the loss rate while reducing the hydrogen fluoride concentration in the tungsten hexafluoride.

According to the present embodiment, the overall purity of tungsten hexafluoride can be, for example, equal to or higher than 99.99% by mass, preferably equal to or higher than 99.999% by mass, and more preferably equal to or higher than 99.9999% by mass.

According to the present embodiment, the loss rate with respect to the amount of 100% by mass of crude tungsten hexafluoride can be, for example, equal to or less than 5% by mass, preferably equal to or less than 3% by mass, and more preferably equal to or less than 1% by mass.

The discharge operation is repeated until the hydrogen fluoride concentration becomes equal to or lower than the desired concentration, and then reflux is stopped. The tungsten hexafluoride in the distillation still 110 is collected into the receiver 150 (receiving tank).

The residual tungsten hexafluoride in the condenser 130 and the distillation column 120 is discharged to the outside of the system by the exhaust gas pump 160. In order to improve the yield of tungsten hexafluoride, the residual tungsten hexafluoride in the condenser 130 and the distillation column 120 may be mixed with tungsten hexafluoride to be subjected to the next distillation operation.

The content of gas components in the purged fraction or the collected tungsten hexafluoride can be measured, for example, a Fourier transform infrared spectrometer.

In Step S160, the tungsten hexafluoride collected after the distillation step (Step S150) is vaporized, and then a storage container is filled with the tungsten hexafluoride. As a result, high-boiling-point impurities, such as $CrF_5$, $SbF_5$, $NbF_5$, and $TaF_5$, can remain in the distillation still 110. Therefore, the content of high-boiling-point impurities in the storage container to be filled can be reduced. Accordingly, high-purity tungsten hexafluoride can be realized.

The storage container of the present embodiment is filled with the tungsten hexafluoride obtained by the purification method described above. The tungsten hexafluoride in the storage container can be stored as a liquid. In a case where the tungsten hexafluoride is stored in this way, storability and transport properties can be improved.

The storage container may include a metal container having an internal space, an inlet/outlet of tungsten hexafluoride provided in the metal container, and a valve provided at the inlet/outlet. The tungsten hexafluoride introduced from the inlet/outlet is stored in the internal space of the metal container. In a case where the tungsten hexafluoride is stored in this way, the handleability of the tungsten hexafluoride can be improved.

It is preferable that at least the inside (inner wall that comes into contact with tungsten hexafluoride) of the metal container of the storage container be made of an anticorrosive metal. Examples of the anticorrosive metal include nickel, a nickel-based alloy, stainless steel (SUS), manganese steel, aluminum, an aluminum-based alloy, titanium, a titanium-based alloy, platinum, and the like. Particularly, from the viewpoint of low cost and ease of handling, the metal container is more preferably made of nickel, such as nickel or a nickel-based alloy, or made of SUS. In a case where the metal container is made of these materials, it is possible to store and transport the tungsten hexafluoride while maintaining high purity.

Hitherto, the embodiments of the present invention have been described. However, the embodiments are merely examples of the present invention, and various configurations other than the above can also be adopted.

EXAMPLE

Hereinafter, the present invention will be specifically described with reference to examples, but the present invention is not limited to the description of the examples.

Example 1

A fluorine gas was reacted with metallic tungsten, thereby obtaining a mixture containing hydrogen fluoride-containing impurities and tungsten hexafluoride. The obtained mixture was transferred to the distillation still 110 of distillation facilities (distillation apparatus 100) shown in FIG. 2 equipped with the distillation column 120 having a column diameter of 40 A and a length of 1,200 mm.

As a packing material for the distillation column 120, 6 mm ((p)×6 mm stainless steel Raschig rings were used. The distillation still 110 was installed at the column bottom, and the condenser 130 was installed at the column top. A gas purger was installed at the top of the condenser 130, and a reflux line was installed at the bottom of the condenser 130. The distillation apparatus 100 in FIG. 2 has a structure in which while the entirety of tungsten hexafluoride (reflux liquid) is returning into the distillation column 120 from the lower portion of the condenser 130 via the reflux line, low-boiling-point impurities in a gas phase are removed from the upper portion of the condenser 130 via the gas purge line.

Subsequently, distillation and purification were performed based on the following (Distillation conditions) by using the distillation apparatus 100, and immediately after the following total reflux time elapsed, a discharge operation for purging gas by the following purge amount was performed the number of times of purge shown below.

(Distillation Conditions)

Internal temperature of distillation still 110: 20° C.

Internal temperature of condenser 130: 10° C.

Total reflux time: 1st to 6th purge operation: 15 min, 7th to 16th purge operation: 20 min Number of times of purge: 16 (number of times the valve of the gas purge line is opened and closed)

Total purge amount: 0.35% by mass with respect to a feed amount of 100% by mass of tungsten hexafluoride The boiling point of tungsten hexafluoride ($WF_6$) is 17.1° C., and the boiling point of hydrogen fluoride (HF) is 19.5° C.

While the hydrogen fluoride concentration in the liquid in the collector before distillation was 73.82 ppm by mass, the hydrogen fluoride concentration in the liquid in the distillation still after distillation was 0.09 ppm by mass. The loss rate of tungsten hexafluoride after distillation was 0.35% by mass (yield: 99.65% by mass).

Example 2

The tungsten hexafluoride in the distillation still 110 obtained in Example 1 was vaporized, another tank (receiver 150) was filled with the tungsten hexafluoride, and the tungsten hexafluoride was collected. The tungsten hexafluoride collected into the receiver 150 did not contain high-boiling-point impurities. Presumably, high-boiling-point impurities might remain in the distillation still 110.

It has been found that the tungsten hexafluoride manufacturing method in Examples 1 and 2 makes it possible to obtain tungsten hexafluoride having a lower hydrogen fluoride concentration with high yield.

This application claims a priority based on Japanese Patent Application No. 2019-056045 filed on Mar. 25, 2019, the entire content of which is incorporated into the present specification.

REFERENCE SIGNS LIST

100: distillation apparatus
110: distillation still
120: distillation column
130: condenser
150: receiver
160: exhaust gas pump

The invention claimed is:

1. A tungsten hexafluoride manufacturing method, comprising:
a reaction step of reacting tungsten with a gas of a fluorine element-containing compound so as to obtain a mixture that contains tungsten hexafluoride and hydrogen fluoride-containing impurities; and
a discharge step of performing distillation of the mixture while performing a discharge operation at least two or more times during the distillation so as to obtain tungsten hexafluoride, the discharge operation being an operation in which the following storage operation and purge operation are alternately performed,
(operation)
storage operation: an operation of creating a total reflux state in a distillation column and then obtaining a mixture gas containing the concentrated hydrogen fluoride in a gas phase portion in the distillation column, and
purge operation: an operation of purging the mixture gas from an upper portion of a condenser provided in the gas phase portion and then stopping the purging.

2. The tungsten hexafluoride manufacturing method according to claim 1,
wherein in the discharge step, the discharge operation is repeated so that tungsten hexafluoride satisfying the following condition is obtained,
(condition)
a content of hydrogen fluoride in the tungsten hexafluoride is equal to or less than 100 ppm by mass.

3. The tungsten hexafluoride manufacturing method according to claim 1,
wherein a total purge amount in the purge operation following the repeated discharge operation is equal to or more than 0.1% by mass and equal to or less than 5% by mass with respect to a feed amount of 100% by mass of the tungsten hexafluoride subjected to the discharge step.

4. The tungsten hexafluoride manufacturing method according to claim 1,
wherein an internal temperature of the condenser is equal to or higher than 5° C. and equal to or lower than 100° C.

5. The tungsten hexafluoride manufacturing method according to claim 1, further comprising:
a filling step of vaporizing the tungsten hexafluoride obtained by the discharge step and filling a storage container with the tungsten hexafluoride.

6. The tungsten hexafluoride manufacturing method according to claim 1,
wherein a loss rate of the tungsten hexafluoride before and after the distillation is equal to or less than 5% by mass with respect to a feed amount of 100% by mass of the tungsten hexafluoride.

7. The tungsten hexafluoride manufacturing method according to claim 1,
wherein the tungsten hexafluoride obtained after the discharge step does not contain one or two or more high-boiling-point impurities selected from the group consisting of $CrF_5$, $SbF_5$, $NbF_5$, and $TaF_5$.

8. The tungsten hexafluoride manufacturing method according to claim 1,
wherein the distillation is performed using a distillation apparatus including a distillation column.

9. The tungsten hexafluoride manufacturing method according to claim 1,
wherein the tungsten hexafluoride obtained after the discharge step is used as a raw material gas for CVD.

10. A tungsten hexafluoride purification method, comprising:
a discharge step of performing distillation of a mixture that contains hydrogen fluoride-containing impurities and tungsten hexafluoride while performing a discharge operation at least two or more times during the distillation so as to obtain tungsten hexafluoride, the discharge operation being an operation in which the following storage operation and purge operation are alternately performed,
(operation)
storage operation: an operation of creating a total reflux state in a distillation column and then obtaining a mixture gas containing the concentrated hydrogen fluoride in a gas phase portion in the distillation column, and
purge operation: an operation of purging the mixture gas from an upper portion of a condenser provided in the gas phase portion and then stopping the purging.

11. The tungsten hexafluoride purification method according to claim 10,
wherein in the discharge step, the discharge operation is repeated so that tungsten hexafluoride satisfying the following condition is obtained,
(condition)
a content of hydrogen fluoride in the tungsten hexafluoride is equal to or less than 100 ppm by mass.

12. The tungsten hexafluoride purification method according to claim 10, further comprising:
a filling step of vaporizing the tungsten hexafluoride obtained by the discharge step and filling a storage container with the tungsten hexafluoride.

* * * * *